United States Patent
Quanz

(10) Patent No.: US 7,175,373 B2
(45) Date of Patent: Feb. 13, 2007

(54) ROTATING TOOL WITH A CLAMPING SHANK

(75) Inventor: Reiner Quanz, Remscheld (DE)

(73) Assignee: Reiner Quanz GmbH & Co. KG, Remscheid (DE)

( * ) Notice: Subject to any disclaimer, the term of this patent is extended or adjusted under 35 U.S.C. 154(b) by 0 days.

(21) Appl. No.: 10/378,099

(22) Filed: Feb. 26, 2003

(65) Prior Publication Data

US 2004/0037661 A1 Feb. 26, 2004

(30) Foreign Application Priority Data

Feb. 27, 2002 (DE) .......................... 202 03 129

(51) Int. Cl.
*B23B 51/02* (2006.01)

(52) U.S. Cl. ........................... 408/226; 407/53
(58) Field of Classification Search ................ 407/53, 407/54; 408/226, 227
See application file for complete search history.

(56) References Cited

U.S. PATENT DOCUMENTS

| | | | | |
|---|---|---|---|---|
| 4,512,692 A | * | 4/1985 | Nielsen ..................... | 408/226 |
| 5,188,488 A | * | 2/1993 | Nakayama et al. ............ | 407/54 |
| 5,340,245 A | * | 8/1994 | Bloechle et al. ............. | 408/226 |
| 5,704,744 A | * | 1/1998 | Kleine et al. ................ | 408/226 |
| 5,984,596 A | * | 11/1999 | Fehrle et al. ................ | 408/226 |
| 6,390,739 B1 | * | 5/2002 | O'Banion ................ | 408/239 R |
| 6,474,656 B1 | * | 11/2002 | Thomas ........................ | 279/30 |
| 6,517,297 B2 | * | 2/2003 | Cochran et al. ............. | 408/226 |
| 2001/0031180 A1 | * | 10/2001 | Vasudeva et al. ............ | 408/211 |

FOREIGN PATENT DOCUMENTS

DE 3413005 A1 * 10/1985

\* cited by examiner

*Primary Examiner*—Derris H. Banks
*Assistant Examiner*—Michael W. Talbot
(74) *Attorney, Agent, or Firm*—Myron Greenspan, Esq.; Lackenbach Siegel, LLP

(57) ABSTRACT

A rotating tool such as a drill, a milling cutter, a countersink, a deburrer and the like, including a working part, which is driven in rotation about an axis of rotation for cutting machining, and also including an axially adjoining clamping shank for insertion into a clamping chuck of a drive machine. The clamping shank is provided with a number of clamping surfaces on its outer circumference for supporting a clamping jaw of the clamping chuck. The clamping shank has a shank radius in the region of each clamping surface which, as seen in a predetermined direction of rotation of the tool, rises from a minimum shank radius to a maximum shank radius as it passes over a range of angle of rise.

11 Claims, 2 Drawing Sheets

ROTATING TOOL WITH A CLAMPING SHANK

TITLE OF THE INVENTION

BACKGROUND OF THE INVENTION

The present invention relates to a rotating tool, in particular a drill, milling cutter, countersink, deburrer or such like cutting tool, consisting of a working part to be driven in rotation about an axis of rotation and designed, in particular, for cutting machining and of an axially adjoining clamping shank for insertion into a clamping chuck of a drive machine, the clamping shank having, on its outer circumference, a number $n \geq 2$ of clamping surfaces for supporting a clamping jaw of the clamping chuck in each case.

In tools of this type, in particular in twist drills and the like, it is known, in the first place, to design the clamping shank cylindrically, that is to say with a circular cross section. This makes very firm clamping of the associated clamping chuck necessary, in order to avoid slipping of the tool, along with the adverse consequences, such as the formation of scores and chips on the circumferential surface of the shank. If clamping is not sufficiently firm, in practice, there is very often slipping of the tool in the clamping chuck.

It is therefore also known, in the case of specific tools, to provide the initially cylindrical shank with secant-like clamping surfaces, thus resulting, in the case of a three-jaw chuck, in what may be referred to as a three-surface driver shank. However, since the clamping surfaces are very narrow in the circumferential direction (the ratio to the remaining cylindrical surfaces being about 1:2 to 1:3), it is very difficult, in the clamping operation, to hit upon the clamping surfaces accurately with the clamping jaws. The cylindrical surfaces are therefore often still hit upon, with the result that the same disadvantages as in the case of completely cylindrical clamping shanks arise. Moreover, even with this type of clamping shank, very firm clamping is still necessary in order to avoid undesirable release during machining.

BRIEF SUMMARY OF THE INVENTION

The object on which the present invention is based is to improve a tool of the type mentioned, in the region of the clamping shank, in such a way that, along with an easier clamping operation, sufficient clamping for the avoidance of release and/or slipping is always ensured.

This is achieved, according to the invention, in that the clamping shank has, in the region of each clamping surface, a shank radius which, as seen in a predetermined direction of rotation of the tool, rises from a minimum shank radius over a range of angle of rise, in particular continuously, to a maximum shank radius. Thus, according to the invention, as seen in the circumferential direction, a kind of ramp surface is formed, which rises radially in the direction of rotation. As a result, the driving clamping jaws of the clamping chuck always run against the clamping surfaces rising in a ramp-like manner, so that, even with relatively loose clamping, a reliable drive of the tool is always achieved. The invention even gives rise, in practice, to automatic self-clamping, in that, in the bearing regions between the clamping jaws and the clamping surfaces, an increase in the frictional connection, up to frictional/form-fitting connection or even form-fitting connection, takes place automatically; with a suitable design of the radially rising clamping surfaces, the clamping connection may even run into self-locking, on the principle of a self-locking cone connection. Advantageously, therefore, even when the chuck is clamped "loosely" by hand, that is to say without a key, reliable play-free and also slip-free and creep-free torque transmission is ensured, so that the clamping operation is also made easier and is speeded up insofar as firm clamping by means of a key may, as a rule, even be dispensed with completely.

It is advantageous, furthermore, if the range of angle of rise of each clamping surface is as large as possible in the circumferential direction, to be precise, preferably, the range of angle of rise amounts to about 85% to 95% of a clamping shank division angle $\alpha = 360°/n$ (with n=number of clamping surfaces=number of clamping jaws of the respectively associated clamping chuck). By virtue of this advantageous configuration, it is very simple to hit upon the clamping surfaces with the clamping jaws, while, for the above-described effect according to the invention, it is unimportant at which point on the clamping surfaces rising radially in a ramp-like manner the clamping jaws come to bear, insofar as they do not hit exactly upon the end points located on the maximum shank radius. However, it is statistically very much more probable to hit upon the rising regions of the clamping surfaces than exactly at their end points.

Between the end points of the clamping surfaces and the starting points of the respectively adjacent clamping surface, transitional surfaces falling radially relatively steeply are formed, which extend in the circumferential direction only over a short range of angle of fall. Should the clamping jaws hit upon these transitional surfaces during the clamping operation, this does not present a problem insofar as, during clamping, the jaws slip over the relatively steep transitional surfaces virtually as far as the starting points of the clamping surfaces. Reliable clamping is consequently ensured in any event.

According to the invention, therefore, the clamping shank, although being conceived basically for a specific direction of rotation (normally for right-hand rotation in drills and such like cutting tools), makes it possible perfectly well also to have a drive in the opposite direction, in that the clamping jaws can then act against the transitional surfaces and thus ensure reliable slip-free rotational drive. This is important, for example, for thread-tapping drills, since, after a threaded bore has been produced, these can be removed from the threaded bore again with the opposite direction of rotation.

Further advantageous design features of the invention and advantages and special effects resulting from these are contained in the following description.

BRIEF DESCRIPTION OF THE SEVERAL VIEWS OF THE DRAWINGS

The invention will be explained in more detail by means of a preferred exemplary embodiment illustrated in the drawing in which.

DETAILED DESCRIPTION OF THE INVENTION

Figure 1:
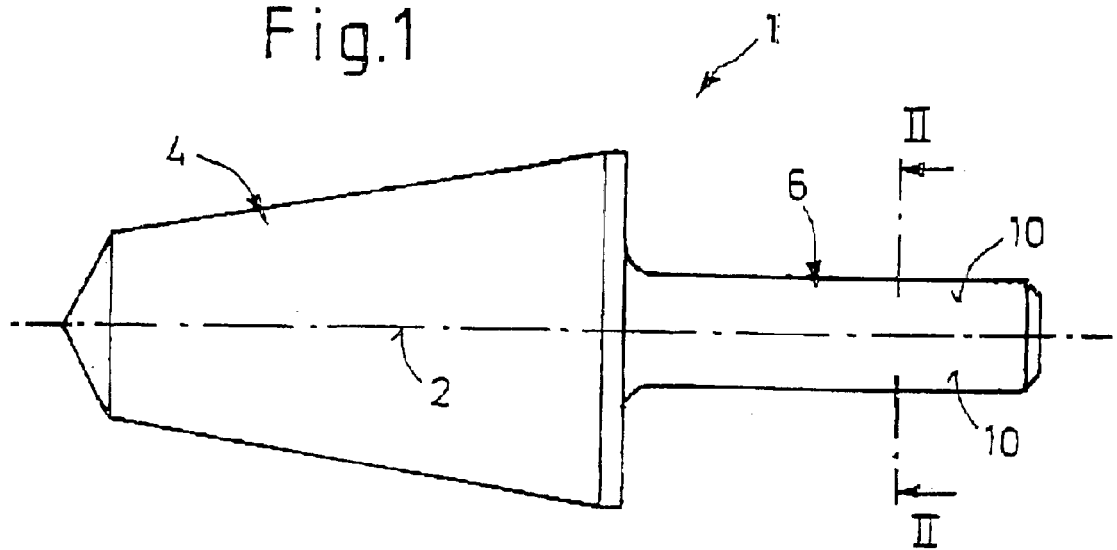
FIG. 1 shows a diagrammatic simplified side view of a tool according to the invention.

FIG. 1 illustrates by way of example a tool 1 which consists of a working part 4 to be driven in rotation about an axis of rotation 2 and of an axially adjoining clamping shank 6. The working part 4 is designed, in particular, for cutting machining, for example as a drill, milling cutter, countersink, deburrer or the like. FIG. 1 illustrates by way of example an essentially conical version as what may be referred to as a boring drill, but it may also be, for example, a step drill or any other type of tool. The clamping shank 6 is inserted, for rotational drive, into a clamping chuck of a drive machine which is not illustrated. Depending on the number n of clamping jaws 8 (see FIG. 3) of the respective clamping chuck, the clamping shank 6 has a corresponding number n of clamping surfaces 10 for supporting one of the clamping jaws 8 in each case. Reference is made, in this respect, to the sectional illustrations in FIGS. 2 and 3.

Figure 2:
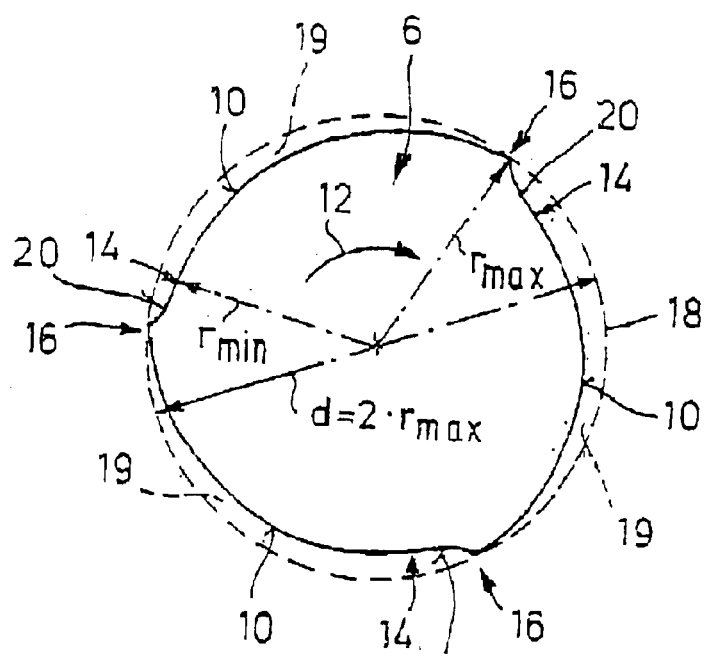
FIG. 2 shows an enlarged cross section through the clamping shank according to the invention in the plane II—II according to FIG. 1.
Figure 3:
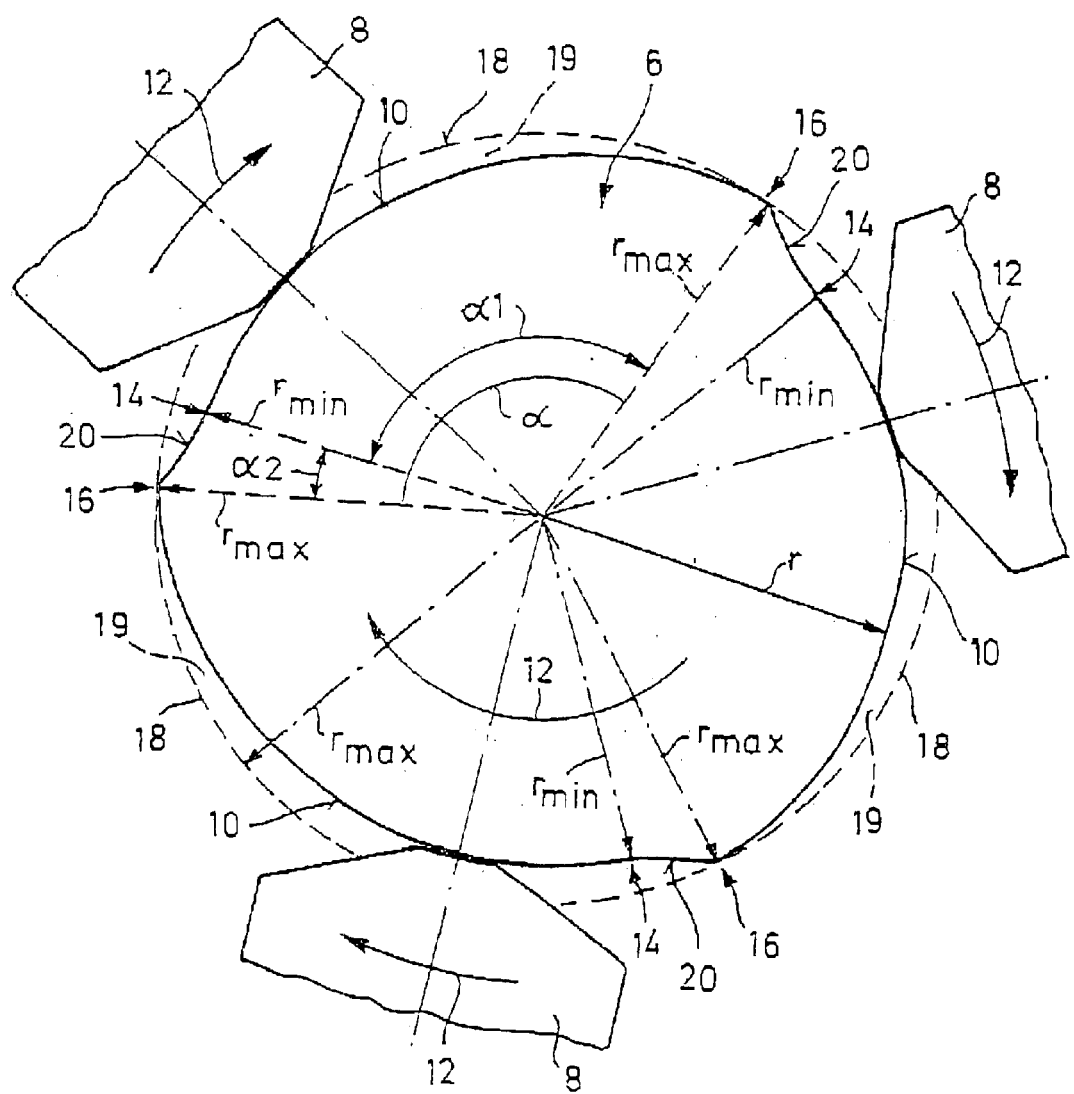
FIG. 3 shows a greater enlargement of the sectional illustration according to FIG. 2, clamping jaws of a clamping chuck being additionally indicated.

As may also be gathered from FIGS. 2 and 3, according to the invention, the clamping shank 6 has, in the region of each clamping surface 10, a shank radius r which, as seen in a predetermined direction of rotation 12 of the tool, rises from a minimum shank radius $r_{min}$ over a range of angle of rise α1 to a maximum shank radius $r_{max}$. This results, for each clamping surface 10, in a starting point 14 with the minimum radius $r_{min}$ and an end point 16 with the maximum radius $r_{max}$. Between these points 14, 16, the shank radius preferably rises continuously in such a way that the clamping surface 10 is curved convexly in cross section. The end points 16 located on the maximum radius $r_{max}$ define a circumcircle 18 depicted by broken lines. The clamping surfaces 10 run in each case from the starting point 14 over the range of angle of rise α1 continuously as far as the circumcircle 18 at the end point 16, so that, between the clamping surfaces 10 and the imaginary circumcircle 18, "gaps" 19 are obtained, which narrow in a sickle-shaped manner in the direction of rotation 12.

Between the end point 16 of each clamping surface 10 and the starting point 14 of the clamping surface 10 which is adjacent in the direction of rotation 12 is formed in each case a radially correspondingly falling transitional surface 20. These transitional surfaces 20 extend in each case over a range of angle of fall α2. Preferably, the shank radius r falls continuously in the region of each transitional surface 20, in such a way that the transitional surface 20 is curved concavely in cross section, preferably a turning point between the concavely curved transitional surface 20 and the continuously adjoining convexly curved clamping surface 10 coinciding approximately with the starting point 14 of the latter.

Depending on the number n of clamping jaws 8 of the respective clamping chuck, a clamping shank division angle α=360°/n is obtained. In the version illustrated, the clamping shank 6 is conceived, for example, for a three-jaw chuck, so that the division angle α=360°/3 is equal to 120°.

In a further preferred embodiment, the range of angle of rise α1 of each clamping surface 10 is in this case about 85% to 95%, in particular about 90%, of the division angle α. Consequently, the range of angle of fall α2 of each transitional surface 20 is approximately of the order of magnitude of 5% to 15%, in particular about 10%, of the division angle α. This results in a ratio α2:α1 of about 1:7 to 1:11, in particular about 1:10.

Furthermore, it is advantageous if the difference $r_{max}-r_{min}$ of the maximum and the minimum shank radius is about 2% to 8% of the diameter d (see FIG. 2) of the circumcircle 18 defined by the end points 16 of the clamping surfaces 10. Since $d=2 \cdot r_{max}$, the difference $r_{max}-r_{min}$ is about 4% to 6% of $r_{max}$. If, for example, the circumcircle diameter ("nominal shank diameter or nominal clamping diameter") is d=10 mm, an order of magnitude of about 2/10 to 3/10 mm is obtained for the difference in radii $r_{max}-r_{min}$.

For the sake of completeness, it may be mentioned that the clamping surfaces 10 and preferably also the transitional surfaces 20 run in each case axially parallel to the axis of rotation 2, with the result that a good large-area support of the clamping jaws 8 on the clamping surfaces 10 is also ensured in the axial direction.

As may easily be understood from the illustration in FIG. 3, during movement in the direction of rotation 12, the clamping jaws 8 always run against the radially rising clamping surfaces 10, with the result that highly reliable torque transmission is ensured. Furthermore, even a reversed rotational drive is also possible, in that, during movement of the clamping jaws 8 in the opposite direction of rotation, a reliable rotational drive is then ensured by means of bearing contact on the transitional surfaces 20. It is clear, furthermore, that, in the clamping operation, the clamping jaws 8 hit exactly upon the region of the clamping surfaces 10 with a high degree of probability. In the event of hitting upon the transitional surfaces 20, the clamping jaws 8 automatically slip over the very steep transitional surfaces 20 into the starting points 14 of the clamping surfaces 10. The probability of the clamping jaws 8 hitting exactly upon the end points 16 must be assumed to be very low. This situation may therefore basically be ignored. This is also supported by the fact that, in clamping operation, the user always moves the tool 1 somewhat within the clamping chuck by means of the clamping shank 6, and it is therefore highly improbable that clamping will ultimately take place exactly at the end points 16.

The invention is not restricted to the exemplary embodiment actually illustrated and described, but also embraces all versions having an identical effect within the meaning of the invention. Thus, it may, above all, be mentioned once again that a version for two-jaw, four-jaw or multi-jaw chucks is also possible.

What is claimed is:

1. A rotating tool (1) including a drill, a milling cutter, a countersink or a deburrer, comprising:

a working part (4) to be driven in rotation about an axis of rotation (2) for cutting or machining, a clamping shank (6) axially adjoining the working part (4) for insertion into a clamping chuck of a drive machine, the clamping shank (6) having at least two clamping surfaces (10) on an outer circumference thereof for supporting a clamping jaw (8) of the clamping chuck in each case, the clamping shank (6) having a shank radius (r) in a region of each clamping surface (10), which rises from a minimum shank radius ($r_{min}$) over a range of angle of rise (α1) to a maximum shank radius ($r_{max}$), as seen in a predetermined direction of rotation (12) of the tool, and wherein the shank radius (r) rises continuously so that the clamping surface (10) is curved convexly in cross section.

2. The tool as claimed in claim 1, wherein an end point (16), located on the maximum shank radius ($r_{max}$), of each clamping surface (10) is followed, as seen in the direction of rotation (12) of the tool, by a radially failing transitional surface (20) which falls over a range of angle of fall (α2) as far as a starting point (14), located on the minimum radius ($r_{min}$), of the next clamping surface (10).

3. The tool as claimed in claim 2, wherein, in a region of the transitional surface (20), the shank radius (r) falls continuously in such a way that the transitional surface (20) is curved concavely in cross section, and a turning point between the concavely curved transitional surface (20) and a continuously adjoining convexly curved clamping surface (10) coincides approximately with the starting point (14) of the latter.

4. The tool as claimed in claim 1, wherein the number of clamping surfaces (10) is equal to the number of clamping jaws (8) of the respectively associated clamping chuck.

5. The tool as claimed in claim 1, wherein the clamping surfaces (10) and transitional surfaces (20) run, in each case, axially parallel to the axis of rotation (2).

6. A rotating tool (1) including a drill, a milling cutter, a countersink or a deburrer, comprising:

a working part (4) to be driven in rotation about an axis of rotation (2) for cutting or machining, a clamping shank (6) axially adjoining the working part (4) for insertion into a clamping chuck of a drive machine, the clamping shank (6) having at least two clamping surfaces (10) on an outer circumference thereof for supporting a clamping jaw (8) of the clamping chuck in each case, the clamping shank (6) having a shank radius (r) in a region of each clamping surface (10), which rises from a minimum shank radius ($r_{min}$) over a range of angle of rise ($\alpha 1$) to a maximum shank radius ($r_{max}$), as seen in a predetermined direction of rotation (12) of the tool, and wherein an end point (16), located on the maximum shank radius ($r_{max}$), of each clamping surface (10) is followed, as seen in the direction of rotation (12) of the tool, by a radially falling transitional surface (20) which falls over a range of angle of fall ($\alpha 2$) as far as a starting point (14), located on the minimum radius ($r_{min}$), of the next clamping surface (10).

7. The tool as claimed in claim 6, wherein, in a region of the transitional surface (20), the shank radius (r) falls continuously in such a way that the transitional surface (20) is curved concavely in cross section, and a turning point between the concavely curved transitional surface (20) and a continuously adjoining convexly curved clamping surface (10) coincides approximately with the starting point (14) of the latter.

8. A rotating tool (1) including a drill, a milling cutter, a countersink or a deburrer, comprising:

a working part (4) to be driven in rotation about an axis of rotation (2) for cutting or machining, a clamping shank (6) axially adjoining the working part (4) for insertion into a clamping chuck of a drive machine, the clamping shank (6) having at least two clamping surfaces (10) on an outer circumference thereof for supporting a clamping jaw (8) of the clamping chuck in each case, the clamping shank (6) having a shank radius (r) in a region of each clamping surface (10), which rises from a minimum shank radius ($r_{min}$) over a range of angle of rise ($\alpha 1$) to a maximum shank radius ($r_{max}$), as seen in a predetermined direction of rotation (12) of the tool, and wherein the range of angle of rise ($\alpha 1$) of each clamping surface (10) is about 85% to 95% of a clamping shank division angle $\alpha=360°/n$.

9. The tool as claimed in claim 8, wherein the angle of rise ($\alpha 1$) of each clamping surface (10) is about 90% of a clamping shank division angle $\alpha=360°/n$.

10. A rotating tool (1) including a drill, a milling cutter, a countersink or a deburrer, comprising:

a working part (4) to be driven in rotation about an axis of rotation (2) for cutting or machining, a clamping shank (6) axially adjoining the working part (4) for insertion into a clamping chuck of a drive machine, the clamping shank (6) having at least two clamping surfaces (10) on an outercircumference thereof for supporting a clamping jaw (8) of the clamping chuck in each case, the clamping shank (6) having a shank radius (r) in a region of each clamping surface (10), which rises from a minimum shank radius ($r_{min}$) over a range of angle of rise ($\alpha 1$) to a maximum shank radius ($r_{max}$), as seen in a predetermined direction of rotation (12) of the tool, and wherein the difference ($r_{max}-r_{min}$) of the maximum and the minimum shank radius is about 2% to 8% of the diameter (d) of a circumcircle (18) defined by the end points (16) of the clamping surface.

11. A rotating tool (1) including a drill, a milling cutter, a countersink or a deburrer, comprising:

a working part (4) to be driven in rotation about an axis of rotation (2) for cutting or machining, a clamping shank (6) axially adjoining the working part (4) for insertion into a clamping chuck of a drive machine, the clamping shank (6) having at least two clamping surfaces (10) on an outer circumference thereof for supporting a clamping jaw (8) of the clamping chuck in each case, the clamping shank (6) having a shank radius (r) in a region of each clamping surface (10), which rises from a minimum shank radius ($r_{min}$) over a range of angle fo rise ($\alpha 1$) to a maximum shank radius ($r_{max}$), as seen in a predetermined direction of rotation (12) of the tool, and wherein, in a region of a radially falling transitional surface (20), the shank radius (r) falls continuously in such a way that the transitional surface (20) is curved concavely in cross section, and a turning point between the concavely curved transitional surface (20) and a continuously adjoining convexly curved clamping surface (10) coincides approximately with a starting point (14) of the latter.

* * * * *